United States Patent [19]

Knapp et al.

[11] 4,116,002
[45] Sep. 26, 1978

[54] CONTROL FOR A VARIABLE DISPLACEMENT PUMP OR MOTOR

[75] Inventors: Kenneth K. Knapp; Charles R. Cornell, both of Battle Creek, Mich.

[73] Assignee: Eaton Corporation, Cleveland, Ohio

[21] Appl. No.: 826,278

[22] Filed: Aug. 22, 1977

[51] Int. Cl.² .............................................. F16H 39/46
[52] U.S. Cl. ......................................... 60/445; 60/488
[58] Field of Search ............ 60/403, 445, 447, DIG. 2, 60/488

[56] References Cited

U.S. PATENT DOCUMENTS

| 3,256,747 | 6/1966 | Kempson | 74/857 |
| 3,606,755 | 9/1971 | Connett | 60/446 |
| 3,890,783 | 6/1975 | Allen et al. | 60/420 |
| 3,901,031 | 8/1975 | Knapp et al. | 60/395 |
| 3,924,410 | 12/1975 | Cornell et al. | 60/403 |

Primary Examiner—Edgar W. Geoghegan
Attorney, Agent, or Firm—John W. Yakimow

[57] ABSTRACT

A control including a control valve and an override valve for use with a variable displacement pump or motor unit having a pair of strokers into and out of which fluid must be directed to vary the displacement of the unit. The control valve ports fluid from a high pressure source to a first control passage and from a second control passage to a low pressure source, reverses said flow, and terminates said flow. The override valve is interposed between the control passages and the strokes and defines a pair of override passages therein used to direct fluid from one control passage to one stroker and from the other stroker to the other control passage. The override valve is selectively movable between a first position directing such flow therethrough and a second position in which such flow is terminated between the control passages and the strokers. Upon flow termination, the override valve communicates, via a bore in the override valve, the strokers with one another to allow the pump unit to go to minimum displacement or the motor unit to go to maximum displacement. In the preferred embodiment, the override valve is responsive to the high pressure fluid being ported from or to respectively, the pump or motor unit. The control may also include a centering valve interposed between the control valve and the override valve. The centering valve is responsive to the pressure of the control fluid to define passages between the first and second control passages and the first and second override passages. Upon a loss of control fluid pressure, the centering valve moves to a second position to cross port the control valve passages and the override valve passages. The override valve may also be actuated via external signals such as an electrical, mechanical, or manual input.

9 Claims, 3 Drawing Figures

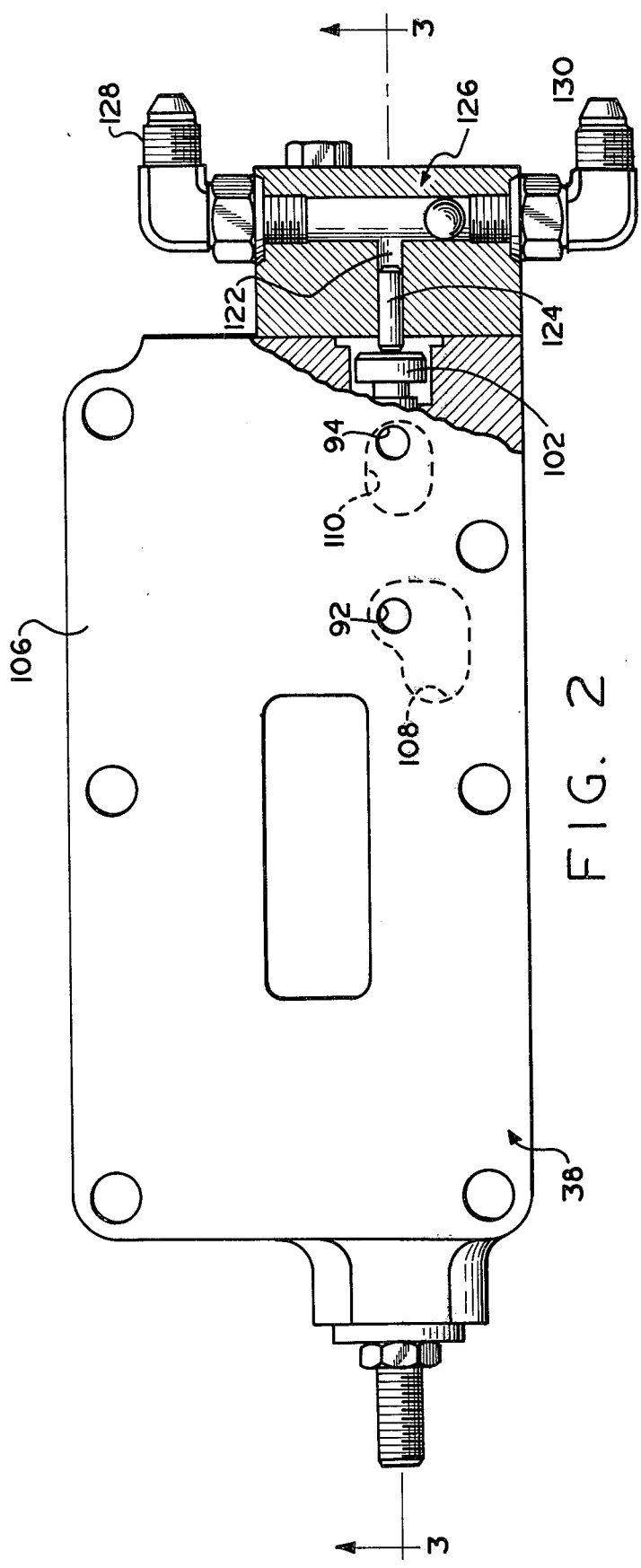
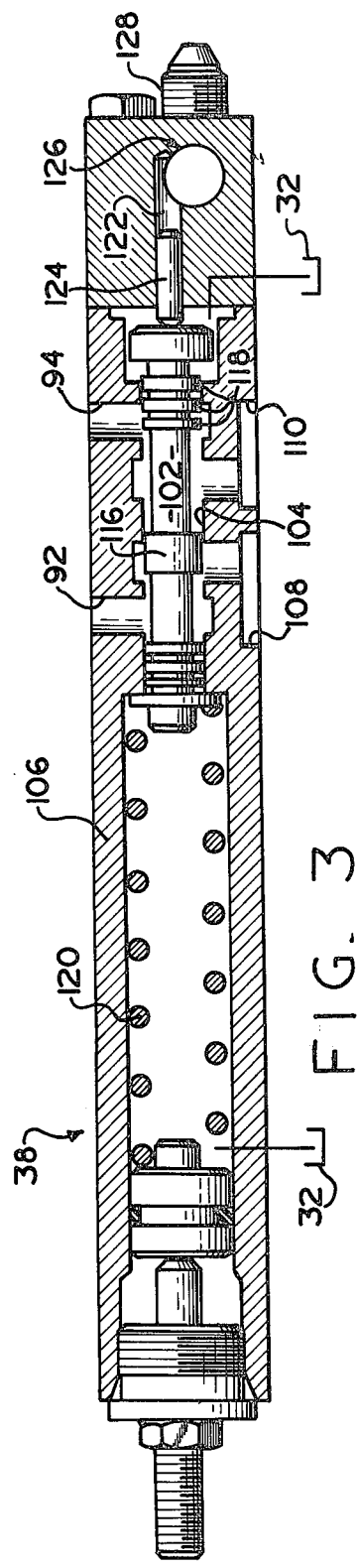

CONTROL FOR A VARIABLE DISPLACEMENT PUMP OR MOTOR

PRIOR ART STATEMENT

The following attached references are considered to be relevant to the present invention: U.S. Pat. Nos. 3,256,747 — Kempson; 3,606,755 — Connett; 3,890,783 — Allen et al.

Kempson discloses a stroker for varying the displacement of a pump via a reversing valve. Upstream of the reversing valve, pistons 49 and 64 are provided to cross port the input lines 35 and 36 to the reversing valve, respectively, in response to an overspeed condition of the prime mover or the application of brake pedal.

Connett discloses a load limiting valve adapted to interconnect the strokers of the pump. A reversing valve is located in parallel with the load limiting valve and used to direct fluid to and from the strokers.

Allen et al. discloses an override valve upstream of a control valve. The override valve responds to an input to first reduce the control pressure to the control valve and then terminate the control pressure to the control valve.

The assignee of this application has been able to develop a unique electrically actuated control to control the operation of a variable displacement pump or motor unit. The main spool of the control is used to port fluid from a relatively high pressure source to one of the strokers of the unit and from the other stroker to a relatively low pressure fluid source. The general arrangement of the valve is described in U.S. Pat. Nos. 3,901,031 and 3,924,410. In order to provide fail safe features in the control, it is necessary to insure that the two stroker ports are connected to one another upon a loss of control pressure. This is accomplished by incorporating a centering spool in the control valve along with the main spool. It is further desirable to provide a pressure override (POR) feature for use with the control to allow the forces acting on the swashplate (springs, moments, inertia, etc.) to move the swashplate of the pump unit towards zero displacement or to more the swashplate of the motor unit towards maximum displacement in response to the pressure of the unit exceeding a predetermined value. It was determined by applicant that the currently accepted method of providing a POR is to use a spool valve that varies the pressure of the control fluid to a control in response to changes in system pressure. With applicant's control, the conventional POR valve would be used to modulate the control fluid pressure to the main spool. Applicant has determined that this causes instability in the control because as the POR valve is modulating the pressure, the centering spool senses a loss in control fluid pressure and, accordingly, shifts toward a position to cross port the strokers.

It is, accordingly, an object of the present invention to provide a pressure override for the given control which will not result in control system instability.

According to a feature of the invention, a POR spool valve is provided between the control and the strokers. The spool of the POR valve is biased at one end to a first position by a spring having a given setting. A chamber is provided at the other end of the POR spool and communicates with a pressure signal from the pump or motor to bias the POR spool against the force of the spring. At pressures less than the preset value of the spring, the POR spool defines passages within the POR valve from first and second ports of the control, respectively, to the two strokers. As the pressure increases, the POR spool shifts against the force of the spring until the passages within the POR valve become restricted to first meter the pressure to the strokers and then block fluid communication between the control and the strokers. When the fluid is blocked to the strokers, the strokers are interconnected via the POR spool permitting fluid communication between the two strokers. The pump unit goes toward zero displacement or the motor unit goes toward maximum displacement to reduce the unit's pressure when the POR valve meters or blocks fluid communication. As the unit pressure decreases, the POR spool again begins to shift under the force of the spring to first terminate fluid communication between the strokers and then open the passages defined by the POR valve between the control and the strokers.

FIG. 1 schematically illustrates a circuit employing a variable displacement pump unit connected to a fixed displacement motor unit wherein the pump unit is controlled by a POR valve according to a feature of the invention.

FIG. 2 illustrates an enlarged view, partly in section, of a POR valve according to FIG. 1.

FIG. 3 is a sectional view taken along line 3—3 of FIG. 2.

Figure 1:
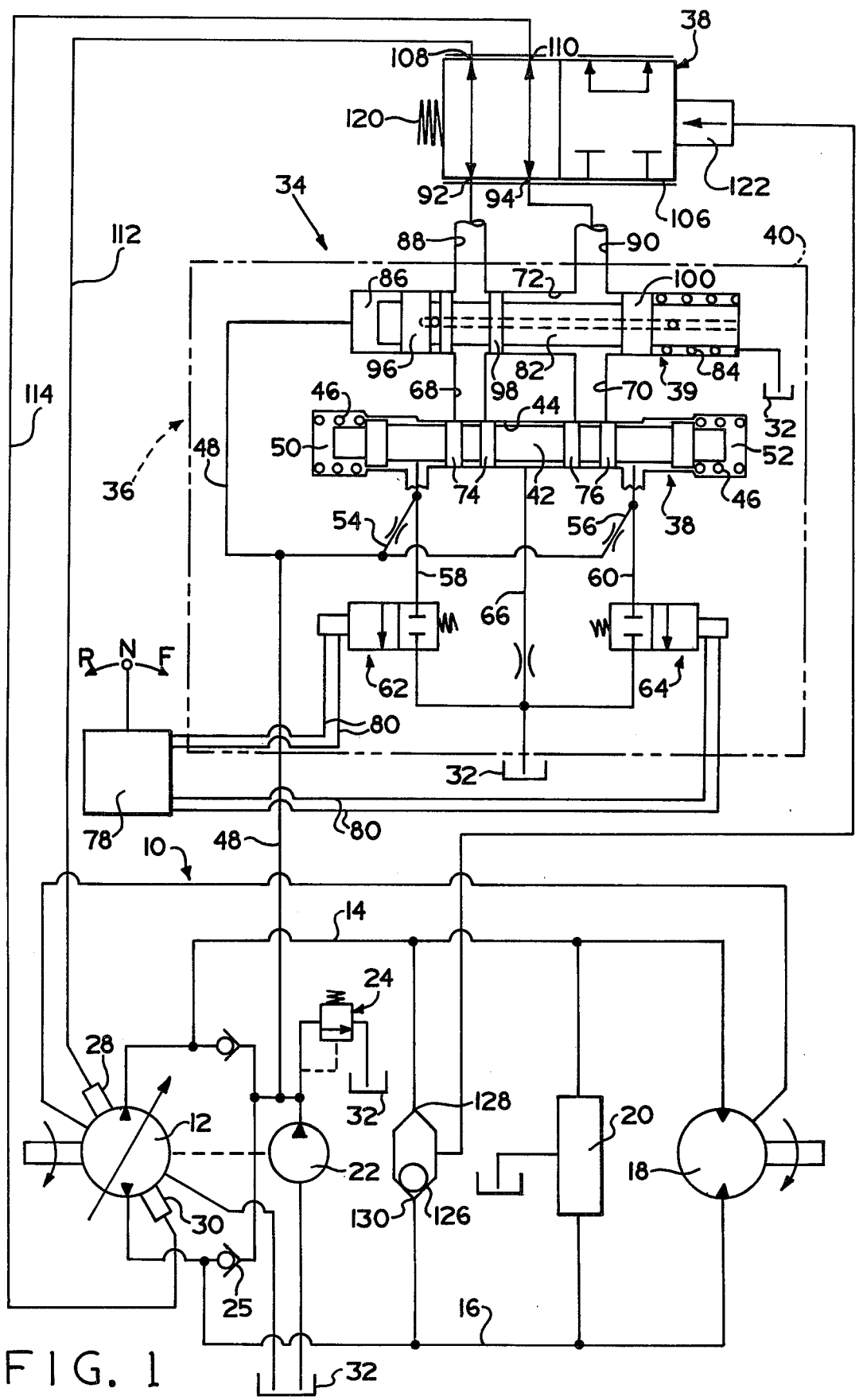

FIG. 1 illustrates a standard closed circuit hydrostatic transmission 10 having a variable displacement pump 12 in fluid communication via a relatively high pressure conduit 14 and a relatively low pressure conduit 16 with a fixed displacement motor 18. Appropriate high and low pressure relief valves are provided in box 20. A charge pump 22 rotatable with pump 12 is in communication with relief valve 24 and via check valve 25, with conduit 16. The displacement of pump 12 is varied by porting fluid from a relatively high pressure source, charge pump 22, to one of the strokers 28, 30 and from the other stroker to a relatively low pressure source — a reservoir 32. A control 34 is provided to port fluid between the sources 22 and 32 and to strokers 28 and 30.

Control 34 includes a control valve 36 and an override valve 38. The operation of control valve 36 is described in greater detail in U.S. Pat. Nos. 3,901,031 and 3,924,410. As illustrated, valve 36 includes a main valve portion 38 and a centering valve portion 39 in a housing 40.

Main valve portion 36 has a main spool 42 slidably received in a main bore 44 and biased to a centered position by springs 46 contacting housing 40 and each end of spool 42. Charge pump 22 communicates with housing 40 via conduit 48. Chambers 50 and 52 in housing 40 communicate respectively with the ends of main spool 42 and, via bore 44 and restricted flow passages 54 and 56, with conduit 48. Further, chambers 50 and 52 communicate via conduits 58 and 60 and on-off solenoid operated valves 62 and 64, with reservoir 32. Another flow restriction passage 66 intermediate the ends of spool 42 is in fluid communication with bore 44 and reservoir 32. A pair of passages 68 and 70 further fluidly communicate bore 44 with centering bore 72 in housing 40. Lands 74 and 76 are provided on spool 42 to provide means to communicate high pressure fluid from passage 54 to passage 68 and from passage 70 to reservoir 32 via passage 66, and to reverse said communication, i.e., communicate passage 70 with high pressure passage 56 and passage 68 with reservoir 32 via passage 66, and to terminate fluid communication between passages 54, 56, 66, 68, and 70. Movement of spool 42 to accomplish the foregoing is provided by either opening the passage through solenoid operated valve 62, or the passage through solenoid operated valve 64 or closing both passages. The solenoid operated valves act as means to pressurize one of the chambers 50, 52 relative to the other chamber. An input, in the form of an electrical signal, is provided to open the passage through the appropriate solenoid by an electrically responsive speed and directional control box 78 via electrical leads 80.

Centering valve portion 39 has a centering spool 82 biased in one direction in bore 72 by a spring 84 contacting housing 40 and one end of spool 82. A chamber 86 in housing 40 communicates with the other end of spool 82 and conduit 48. When charge pump 22 is operating, the pressure of the fluid in chamber 86 is sufficient to bias spool 82 to the right in FIG. 1 against the force of spring 84. A pair of ports 88 and 90 communicate with centering bore 72 and first and second ports 92 and 94 in override valve 38. Lands 96, 98, and 100 are located on spool 82 to provide means to communicate passage 68 with port 88 and passage 70 with port 90 when the pressure of the fluid in chamber 86 moves spool 82 to the right in FIG. 1 and to communicate both passages 68 and 70 with both ports 88 and 90 when the spring moves spool 82 to the left in FIG. 1.

Override valve 38 includes an override spool 102 slidably received in an override bore 104 in housing 106 (FIGS. 2 and 3). First and second passages 108 and 110 in housing 106 communicate with conduits 112 and 114 which respectively communicate with strokers 28 and 30. Lands 116 and 118 are located on spool 102 to provide means to communicate first port 92 with first passage 108 and second port 94 with second passage 110 when spool 102 is in the position illustrated in FIGS. 1 and 3, and to communicate first passage 108 solely with second passage 110 when spool 102 is moved to the left in FIGS. 1 and 3. Lands 116 and 118 also respectively modulate flow between ports 92 and 94 and passages 108 and 110 between the open and closed position of spool 102.

Spool 102 is biased to the right by spring 120 contacting housing 106 and one end of spool 102. The other end of spool 102 is in communication with a chamber 122 in housing 106 via a needle roller 124. A shuttle valve 126 ports the fluid under the highest pressure from conduit 14 or 16, (conduit 14 in the disclosed embodiment) to chamber 122. In FIGS. 2 and 3, shuttle valve 126 is located in housing 106 and conduits 14 and 16 are, respectively, connected to ports 128 and 130.

Although override valve 38 is illustrated as a pressure override valve, it is contemplated that shuttle valve 126 can be replaced by other hydraulic cylinder/piston arrangements, an on-off solenoid, or mechanical linkage to force spool 102 against spring 120 to the leftward position in FIGS. 1 and 3 and thereby communicate first passage 108 solely with second passage 110. If a solenoid is used, the input could be an on-off switch which would be actuated when it was desired to quickly bring transmission 10 to a neutral operational condition. Further, it is contemplated that control 34 could be used to operate a variable displacement motor.

By the foregoing, applicant has provided a control for a variable displacement pump or motor unit which has an override function which will not introduce instability into the control valve. This was accomplished first by making the passages through the override valve as an integral part of the passages from the control valve to the strokers and second by locating the override valve intermediate the control valve and the strokers. Accordingly, the override valve provides two separate passages from the control valve to the strokers in the open position, and terminates such communication in the closed position by communicating the strokers solely with one another. The valve further acts to modulate fluid flow to the strokers between the open and closed positions.

We claim:

1. A control for use with a variable displacement pump or motor unit having a pair of strokers into and out of which fluid must be directed to vary the displacement of the unit and having a relatively high pressure fluid conduit and a relatively low pressure fluid conduit, a source of fluid at a relatively high pressure and a source of fluid at a relatively low pressure, said control comprising:
   A. control valve means having first and second passages adapted to communicate and be intermediate said sources of fluid and said strokers and operational in response to an input to direct fluid from said high pressure source toward one of said strokers via said first passage and simultaneously from said other stroker to said low pressure source via said second passage to vary the displacement of said unit; and
   B. override valve means adapted to communicate and be intermediate said control valve means and said strokers and having a first port adapted for fluid communication with said first control passage, and a second port adapted for fluid communication with said second control passage, a first passage adapted for fluid communication with said one stroker, a second passage adapted for fluid communication with said other stroker, and means for directing fluid between said first override passage and said first port and simultaneously between said second override passage and said second port and responsive to another input to first restrict said fluid communication and then terminate said fluid communication and during said termination to communicate said first and second override passages.

2. A control according to claim 1 wherein said control valve means comprises:
   C. a housing defining said first and second control passages and a bore communicating with said control passages;
   D. means in said housing adapted to communicate said high and low pressure sources with said bore at spaced locations;
   E. a main spool in sliding engagement with said bore and having a pair of ends;
   F. means on said main spool to communicate said high pressure source with said first control passage and said low pressure source with said second control passage when said spool is in a first position, and to terminate all communication between said control passages and said sources when said spool is in a second position;
   G. a pair of springs, each spring contacting said housing and an end of said spool to bias said spool toward said second position;
   H. a pair of chambers, each chamber being defined by said housing and in communication with an end of said spool;

I. means for introducing fluid under pressure to both chambers; and
J. means responsive to said input to reduce the pressure of the fluid in one of said chambers to bias said spool against one of said springs toward said first position.

3. A control according to claim 2 wherein said control valve means further comprises:
J. means on said main spool to communicate said high pressure source with said second control passage and said low pressure source with said first control passage when said spool is in a third position, said second position being intermediate said first and third positions; and wherein said means responsive to said input comprises;
K. means to selectively reduce the pressure of the fluid within one of said chambers to bias said spool against one of said springs toward either said first or third position.

4. A control according to claim 2 wherein said control valve means further comprises:
J. another bore in said housing in communication with and intermediate said first and second control passages and said first and second ports;
K. a centering spool in sliding engagement with said other bore and having a pair of ends;
L. means on said centering spool to communicate said first control passage with said first port and said second control passage with said second port when said centering spool is in a first position and to communicate all of said control passages and ports with one another when said centering spool is in a second position;
M. a spring contacting said housing and one end of said centering spool to bias said centering spool toward said second position;
N. a chamber defined by said housing in communication with the other end of said centering spool; and
O. means to communicate said high pressure source with said centering spool chamber to bias said centering spool against said spring toward said first position.

5. A control according to claim 1 wherein said means for directing fluid between said override passages and said ports comprises:
C. a housing defining an override bore in communication with and intermediate said first and second ports and said first and second override passages;
D. an override spool in sliding engagement with said override bore and having a pair of ends;
E. a spring contacting said override housing and one end of said override spool to bias said override spool toward a first position;
F. a chamber defined in said override housing communicating with said other end of said override spool;
G. means communicating said high pressure conduit with said override chamber to bias said override spool against said spring to a second position in response to the pressure of said fluid in said override chamber exceeding a predetermined value; and
H. means on said override spool to communicate said first and second override passages via said override bore when said override spool is in said second position and to communicate said first port with said first override passage and said second port with said second override passage via said override bore when said override spool is in said first position.

6. A control according to claim 1 wherein:
C. said control valve means includes
 (1) a main bore;
 (2) a centering bore communicating with said first and second ports;
 (3) means defining said first and second control passages in communication with said bores at spaced locations;
 (4) means communicating said high and low pressure sources with said main bore at spaced locations;
 (5) a main spool in said main bore;
 (6) means responsive to said one input to communicate fluid between said high pressure source and said first control passage and between said low pressure source and said second control passage, to reverse said communication, and to terminate said communication;
 (7) a centering spool in said centering bore;
 (8) means on said centering spool to communicate fluid between said first control passage and said first port and between said second control passage and said second port and to communicate said control passages and said ports with one another; and
D. said override valve means includes
 (1) an override bore communicating with said ports and said override passages;
 (2) an override spool in said override bore; and
 (3) said means for directing fluid includes means on said override spool to communicate said ports and said override passages as provided in claim 1.

7. A control according to claim 1 wherein said control valve means further comprises centering valve means intermediate said first and second control passages and said first and second ports and operational in response to a third input to communicate said first control passage with said first port and said second control passage with said second port and to communicate all of said control passages and ports with one another in the absence of said third signal.

8. A control according to claim 7 wherein said centering valve means further comprises:
C. a housing;
D. a bore in said housing in communication with and intermediate said first and second control passages and said first and second ports;
E. a centering spool in sliding engagement with said bore and having a pair of ends;
F. means on said centering spool to communicate said first control passage with said first port and said second control passage with said second port when said centering spool is in a first position and to communicate all of said control passages and ports with one another when said centering spool is in a second position;
G. a spring contacting said housing and one end of said centering spool to bias said centering spool toward said second position;
H. a chamber defined by said housing in communication with the other end of said centering spool; and
I. means to communicate said high pressure source with said centering spool chamber to bias said centering spool against said spring toward said first position.

9. A control according to claim 1 wherein said means for directing fluid between said override passages and said ports comprises:
C. a housing defining an override bore in communication with and intermediate said first and second ports and said first and second override passages;
D. an override spool in sliding engagement with said override bore and having a first and a second position within said bore;
E. means on said override spool to communicate said first and second override passages via said override bore when said override spool is in said first position and to communicate said first port with said first override passage and said second port with said second override passage via said override bore when said override spool is in said second position; and wherein
F. said other input is selected from the group consisting of an electrical actuation, a mechanical actuation, and a fluid pressure actuation.

* * * * *

UNITED STATES PATENT AND TRADEMARK OFFICE
CERTIFICATE OF CORRECTION

PATENT NO. : 4,116,002

DATED : September 26, 1978

INVENTOR(S) : Kenneth K. Knapp, Charles R. Cornell

It is certified that error appears in the above-identified patent and that said Letters Patent are hereby corrected as shown below:

Abstract: Col. 2, line 4:      "strokes" should read "strokers".

Col. 1, line 42      "more" should read "move".

Col. 2, line 40:      "to" should read "the"

Signed and Sealed this

Sixteenth Day of January 1979

[SEAL]

Attest:

RUTH C. MASON
*Attesting Officer*

DONALD W. BANNER
*Commissioner of Patents and Trademarks*